US008820936B2

(12) United States Patent
Chen

(10) Patent No.: US 8,820,936 B2
(45) Date of Patent: Sep. 2, 2014

(54) ELECTRONIC DEVICE HAVING 3-D IMAGE PROJECTION MECHANISM AND 3-D IMAGE PROJECTION METHOD OF THE SAME

(71) Applicant: HTC Corporation, Taoyuan (TW)

(72) Inventor: Chia-Han Chen, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 210 days.

(21) Appl. No.: 13/633,988

(22) Filed: Oct. 3, 2012

(65) Prior Publication Data
US 2014/0092085 A1 Apr. 3, 2014

(51) Int. Cl.
*G03B 21/00* (2006.01)
*G03B 21/58* (2014.01)
*H04M 1/02* (2006.01)
*G03B 21/60* (2014.01)
*G06T 15/00* (2011.01)
*H04N 13/04* (2006.01)

(52) U.S. Cl.
CPC ............... *G06T 15/00* (2013.01); *G03B 21/58* (2013.01); *H04M 1/0206* (2013.01); *G03B 21/608* (2013.01); *H04N 13/0459* (2013.01)
USPC .......... 353/7; 353/8; 353/52; 353/94; 353/99; 353/121; 345/6; 345/7

(58) Field of Classification Search
USPC .................. 353/7–8, 52–61, 94, 95, 99, 121; 359/15, 22, 24, 32, 462, 464, 472; 345/6–7, 173–174, 177, 419; 348/743–747
See application file for complete search history.

(56) References Cited

U.S. PATENT DOCUMENTS

| 5,865,522 A | 2/1999 | Gold |
| 7,050,020 B2* | 5/2006 | Uehara et al. ...................... 345/6 |
| 8,690,337 B2* | 4/2014 | Nishigaki et al. ............... 353/20 |
| 2003/0081184 A1 | 5/2003 | Li et al. |
| 2009/0079941 A1 | 3/2009 | Miller et al. |
| 2009/0185138 A1* | 7/2009 | Kubara ............................. 353/8 |
| 2010/0045569 A1 | 2/2010 | Estevez et al. |
| 2010/0085424 A1* | 4/2010 | Kane et al. ...................... 348/53 |
| 2012/0208603 A1 | 8/2012 | Sakai et al. |

OTHER PUBLICATIONS

European Search Report dated Oct. 10, 2013.

\* cited by examiner

*Primary Examiner* — Sultan Chowdhury
(74) *Attorney, Agent, or Firm* — McClure, Qualey & Rodack, LLP

(57) ABSTRACT

An electronic device having a 3-D image projection mechanism is provided. The electronic device comprises a display panel, a processing module, a projection screen and at least two micro projectors. The display panel is formed on a main body of the electronic device to display a 2-D display frame. The processing module determines whether a 3-D display request is received and generates a 3-D display command when the 3-D display request is received. The projection screen is formed according to the 3-D display command and is substantially vertical to the display panel, in which a light refractive rate of the projection screen is different from that of the air around the projection screen. The micro projectors are disposed in a circumference of the display panel and project image on the projection screen according to the 3-D display command such that a 3-D display frame is formed thereon.

20 Claims, 4 Drawing Sheets

ELECTRONIC DEVICE HAVING 3-D IMAGE PROJECTION MECHANISM AND 3-D IMAGE PROJECTION METHOD OF THE SAME

BACKGROUND

1. Technical Field

The present disclosure relates to an electronic device and a method for forming 3-D images. More particularly, the present disclosure relates to an electronic device having a 3-D image projection mechanism and a 3-D image projection method.

2. Description of Related Art

In recent daily life, human life could not be separated with electronic tools. Handheld devices such as cellphones, smartphones and personal digital assistants provide the considerable advantages that they are easy to carry and are capable of performing communication. Complex electronic devices such as tablet PCs and notebook computers have even more powerful data processing and computation ability. Due to the advantages described above, the electronic devices become indispensable in our lives.

In order to allow the user to communicate with the electronic devices, the most intuitive way is to adapt display modules on the devices. Flat display panels that generates two-dimensional (2-D) images, whether they are touch panels or non-touch panels, are common in the present electronic devices. Recently, three-dimensional (3-D) display technology becomes a popular topic. Hence, the electronic devices that are capable of displaying 3-D images are now in demand. However, an efficient 3-D display mechanism is still rare to be seen in the present electronic devices.

Accordingly, what is needed is an electronic device having a 3-D image projection mechanism and a 3-D image projection method to address the above issues.

SUMMARY

An aspect of the present invention is to provide an electronic device having a 3-D (three-dimensional) image projection mechanism. The electronic device comprises a display panel, a processing module, a projection screen and at least two micro projectors. The display panel is formed on a main body of the electronic device to display a 2-D display frame. The processing module determines whether a 3-D display request is received and generates a 3-D display command when the 3-D display request is received. The projection screen is formed according to the 3-D display command and is substantially vertical to the display panel, wherein a light refractive rate of the projection screen is different from that of the air around the projection screen. The at least two micro projectors are disposed in a circumference of the display panel for projecting an image on the projection screen according to the 3-D display command and 3-D frame data such that a 3-D display frame is formed on the projection screen.

Another aspect of the present invention is to provide a 3-D image projection method for projecting 3-D image used in an electronic device. The 3-D image projection method comprises the steps outlined below. Whether a 3-D display request is received is determined. A 3-D display command is generated when the 3-D display request is received. A projection screen is formed according to the 3-D display command such that the projection screen is substantially vertical to a display panel on a main body of the electronic device, wherein a light refractive rate of the projection screen is different from that of the air around the projection screen. An image is projected on the projection screen by at least two micro projectors disposed in a circumference of the display panel according to the 3-D display command and 3-D frame data. A 3-D display frame is formed on the projection screen.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
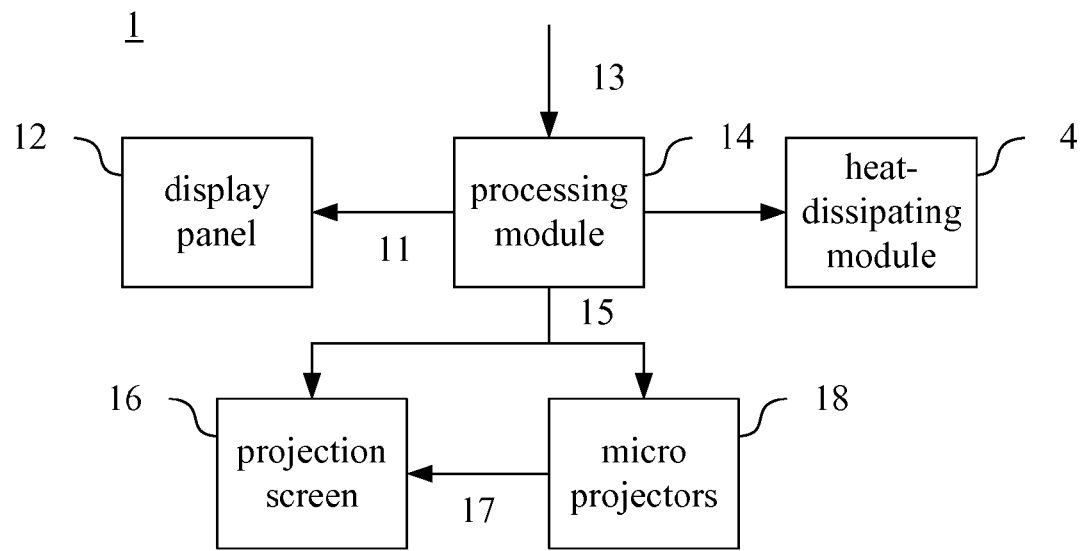
FIG. 1A is a block diagram of an electronic device having a 3-D (three-dimensional) image projection mechanism in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

Figure 1B:
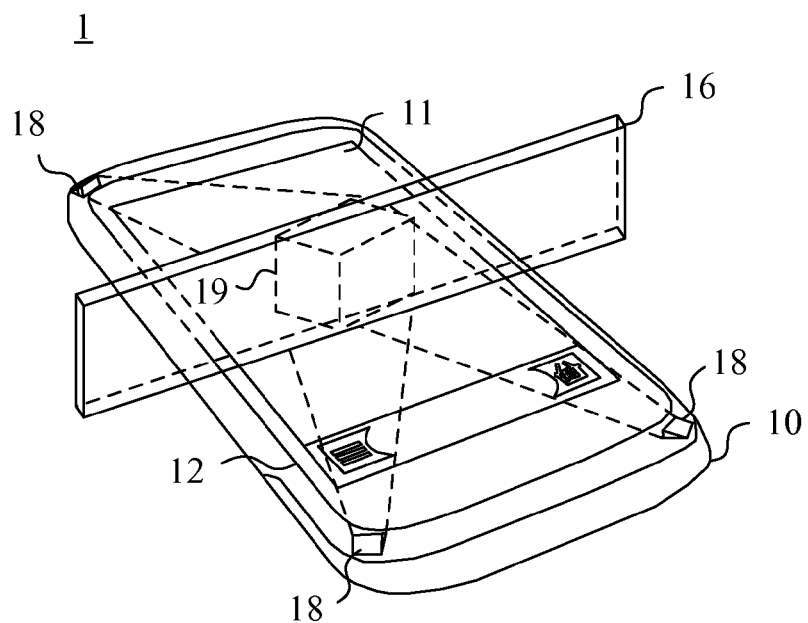
FIG. 1B is a 3-D view of the electronic device in an embodiment of the present invention.

FIG. 1A is a block diagram of an electronic device 1 having a 3-D (three-dimensional) image projection mechanism in an embodiment of the present invention. FIG. 1B is a 3-D view of the electronic device 1 in an embodiment of the present invention. In different embodiments, the electronic device 1 can be a handheld device such as a cellphone, a smartphone or a personal digital assistant or can be a complex electronic device such as a tablet PC or a notebook computer. The electronic device 1 comprises a main body 10, a display panel 12, a processing module 14, a projection screen 16 and micro projectors 18.

The display panel 12 is formed on the main body 10 of the electronic device 1 to display a 2-D display frame 11. The processing module 14 is disposed inside the main body 10 of the electronic device 1 in the present embodiment and is therefore not depicted in FIG. 1B. The processing module 14 determines whether a 3-D display request 13 is received and generates a 3-D display command 15 when the 3-D display request 13 is received.

In an embodiment, the processing module 14 mentioned above determines whether the 3-D display request 13 is received when the processing module 14 receives a communication connection request. For example, when the electronic device 1 receives a communication connection request from a telephone service or a VoIP service, the processing module 14 can determine whether the communication connection request has the 3-D display request 13. When there is 3-D display data corresponding to the communication connection request that needs to be transmitted from an external device to the electronic device 1, the 3-D display command 15 can be generated to display the 3-D display data received by the electronic device 1.

In an embodiment, the processing module 14 mentioned above determines whether the 3-D display request 13 is received when the processing module 14 receives a video playback request. For example, when the user wants to activate a video playback application (not shown) of the electronic device 1, the video playback request is generated by the video playback application according to the selected video data such that the processing module 14 can determine whether the video playback request has the 3-D display request 13. When the video data is 3-D video data, the 3-D display command 15 can be generated to display the 3-D video data.

In different embodiments, the processing module 14 can activate the 3-D display mechanism according to the communication connection request or the video playback request having the 3-D display request 13 or further according to a confirming input from the user. For example, when the user receives a communication connection request from an automobile salesman and the processing module 14 determines that the communication connection request has the 3-D display request 13, the processing module 14 can further display a user interface to notify the user and allow the user to decide whether to display the 3-D display data or not. After the user decides to display the 3-D display data, the processing module 14 can display a 3-D image of a specific model of car by using the projection screen 16 and the micro projectors 18 for the user's reference.

The operation mechanism of the projection screen 16 and the micro projectors 18 is described in detail in the following embodiments.

In an embodiment, the projection screen 16 is a transparent plastic screen or a transparent glass screen, in which a light refractive rate of the projection screen is different from that of the air around the projection screen. After the processing module 14 generates the 3-D display command 15 according to the 3-D display request 13, the projection screen 16 can be formed according to the 3-D display command 15 and is substantially vertical to the display panel 12. It is noted that the term "substantially vertical" means that the angle between the projection screen 16 and the display panel 12 does not necessarily equal to 90 degrees and can be deviated from 90 degrees within a reasonable and tolerable range.

The micro projectors 18 are disposed in a circumference of the display panel 12. The number of the micro projectors 18 is at least two. In the present embodiment, the number of the micro projectors 18 is three. In other embodiments, the number of the micro projectors 18 can be adjusted in dependence on different conditions. After the processing module 14 generates the 3-D display command 15 according to the 3-D display request 13, the micro projectors 18 projects an image on the projection screen 16 according to the 3-D display command 15 and 3-D frame data 17. A 3-D display frame 19 is formed on the projection screen 16 subsequently since the light refractive rate of the projection screen 16 is different from that of the air around the projection screen 16.

Figure 2A:
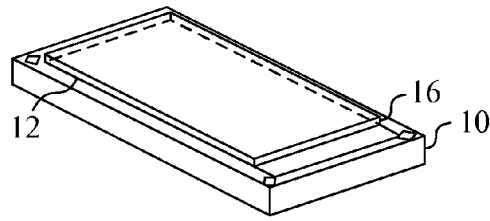
FIG. 2A to FIG. 2D are simplified 3-D views of the electronic device in an embodiment of the present invention.

FIG. 2A to FIG. 2D are simplified 3-D views of the electronic device 1 in an embodiment of the present invention. As shown in FIG. 2A, the projection screen 16 is disposed parallelly on the display panel 12 before the processing module 14 depicted in FIG. 1A generates the 3-D display command 15.

Figure 2B:
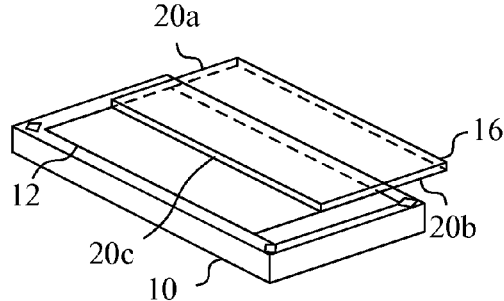

As shown in FIG. 2B, the projection screen 16 comprises a rotary axis side 20c and two lateral sides 20a and 20b adjacent to the rotary axis side 20c in the present embodiment. Sliding tracks (not shown) can be formed between the two lateral sides 20a, 20b and the main body 10 such that the two lateral sides 20a and 20b of the projection screen 16 can move laterally with respect to the main body 10 to a fixed position of the electronic device 1 according to the 3-D display command 15 first. For example, two pillars (not shown) can be disposed on the two ends of the rotary axis side 20c such that the projection screen 16 can move to the fixed position by using the pillars to slide along the sliding tracks.

Figure 2C:
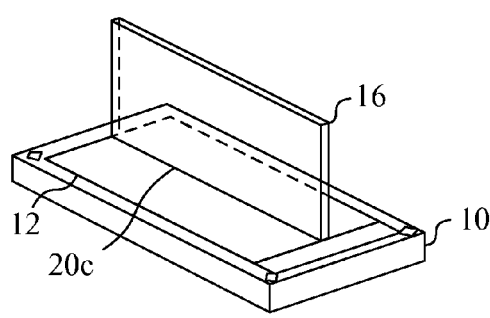

As shown in FIG. 2C, the projection screen 16 has the rotary axis side 20c in the present embodiment. The projection screen 16 can rotate relative to the rotary axis side by using a rotary hinge disposed on the rotary axis side 20c to a position that is substantially vertical to the display panel 12. In an embodiment, the micro projectors 18 at the appropriate locations can project image on the projection screen 16 when the projection screen 16 moves to the position depicted in FIG. 2C.

Figure 2D:
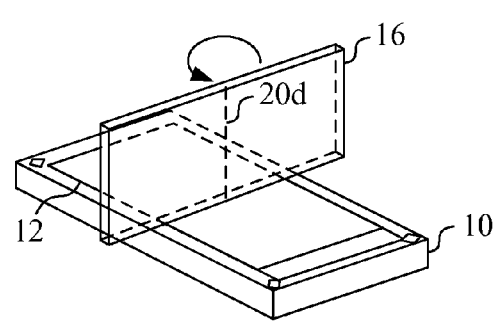

As shown in FIG. 2D, after the projection screen 16 moves to be substantially vertical to the display panel 12, it further rotates relative to a central axis 20d substantially vertical to the display panel 12 such that the micro projectors 18 project the image on the rotated projection screen 16 as shown in FIG. 1B. It is noted that the micro projectors 18 are distributed on both sides of the projection screen 16 when projection screen 16 is either at the position as shown in FIG. 2C or at the position as shown in FIG. 2D. Consequently, the user can observe the 3-D display frame on both sides of the projection screen 16.

Figure 3:
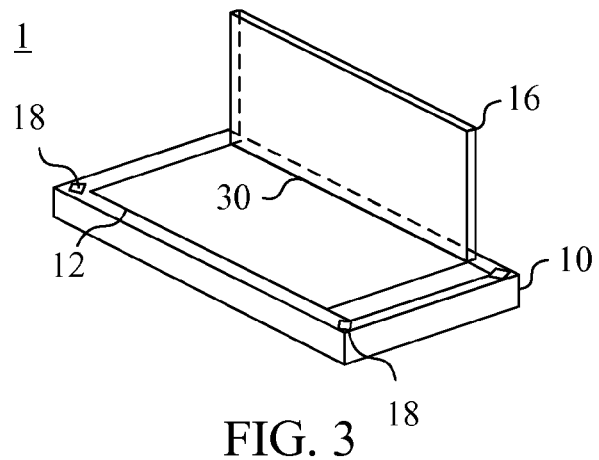
FIG. 3 is a simplified 3-D view of the electronic device in an embodiment of the present invention.

FIG. 3 is a simplified 3-D view of the electronic device 1 in an embodiment of the present invention. In the present embodiment, the projection screen 16 is also disposed parallelly on the display panel 12 before the processing module 14 depicted in FIG. 1A generates the 3-D display command 15. After the processing module 14 generates the 3-D display command 15, the projection screen 16 can directly rotates relative to a rotary axis side 30 such that it is substantially vertical to the display panel 12. The micro projectors 18 at the appropriate locations can project image on the projection screen 16. It is noted that when the projection screen 16 is at the position depicted in FIG. 3, only the two micro projectors 18 distributed in one side of the projection screen 16 can project the image on the projection screen 16. Therefore, the user can only observe the 3-D display frame on the side of the of the projection screen that is opposite to the location of the micro projectors 18.

Figure 4:
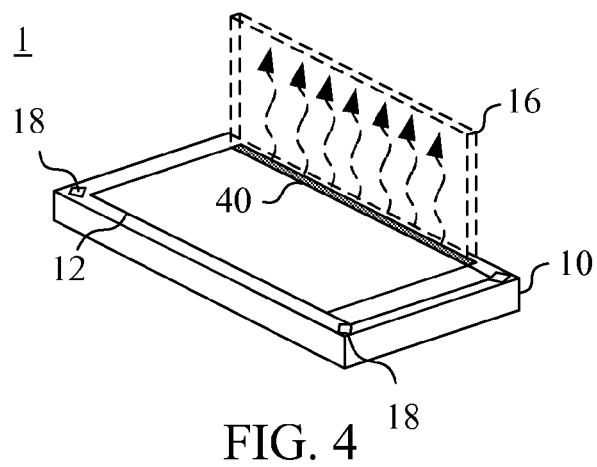
FIG. 4 is a simplified 3-D view of the electronic device in an embodiment of the present invention.

FIG. 4 is a simplified 3-D view of the electronic device 1 in an embodiment of the present invention. In the present embodiment, the electronic device 1 can further comprises a heat-dissipating module 4 as shown in FIG. 1A and comprises an air passage 40 in the main body 10 as shown in FIG. 4.

In the present embodiment, the projection screen 16 is a wall of airflow generated according to exhausting a heat-dissipating airflow from the heat-dissipating module 4 through the air passage 40. Since the airflow speed and the temperature of the wall of airflow are different from the air around it, the wall of airflow can also has a light refractive rate different from that of the air around it. The micro projectors 18 at the appropriate locations can further project image on the wall of airflow.

Similarly, when the projection screen 16 is at the position depicted in FIG. 4, only the two micro projectors 18 distributed in one side of the projection screen 16 can project the image on the projection screen 16. Therefore, the user can only observe the 3-D display frame on the side of the of the projection screen that is opposite to the location of the micro projectors 18. It is noted that in an embodiment, the wall of airflow can be formed at the central location of the display panel 12 (e.g. by dividing the display panel 12 into two blocks and disposing the air passage on the central part of the two blocks) such that the image can be projected to the projection screen 16 from both sides.

Figure 5:
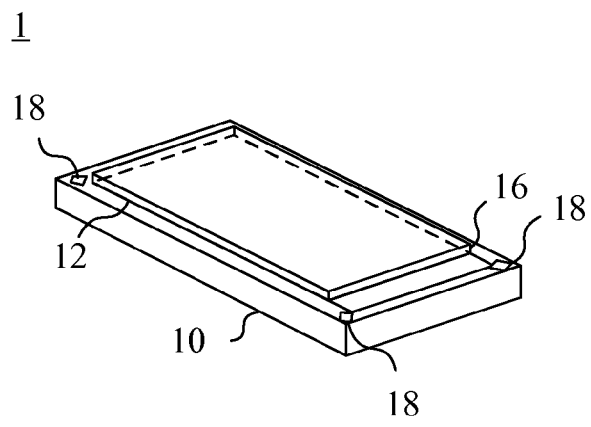
FIG. 5 is a simplified 3-D view of the electronic device in an embodiment of the present invention.

FIG. 5 is a simplified 3-D view of the electronic device 1 in an embodiment of the present invention. In the present embodiment, the micro projectors 18 are embedded in the main body 10 of the electronic device 1 before the processing module 14 generates the 3-D display command 15 without being exposed. After the processing module 14 generates the 3-D display command 15, the micro projectors 18 can be ejected from the main body 10 to be exposed and to project the image. Therefore, when the micro projectors 18 are not in use, they can be embedded inside the main body 10 without being exposed. The risk of accidental collision and damage can be reduced.

According to the above embodiments, the electronic device 1 of the present invention can display the 3-D display frame by using the micro projectors 18 and the projection screen 16 that is transparent and has a light refractive rate different from that of the air around it. The projection screen 16 can be formed in a position that is substantially vertical to the display panel 12 by using different forming processes and the micro projectors 18 can project the image thereon. Furthermore, the processing module 14 can determine whether the video playback request and the communication connection request related to such as a phone call has the 3-D display request 13 to active the 3-D display mechanism. It is noted that the embodiments described above are merely examples and are not used to limit the formation of the projection screen 16. Further, the number and the location of the micro projectors 18 are not limited by the figures and the descriptions in the above embodiments and can be adjusted and designed according to different applications.

Figure 6:
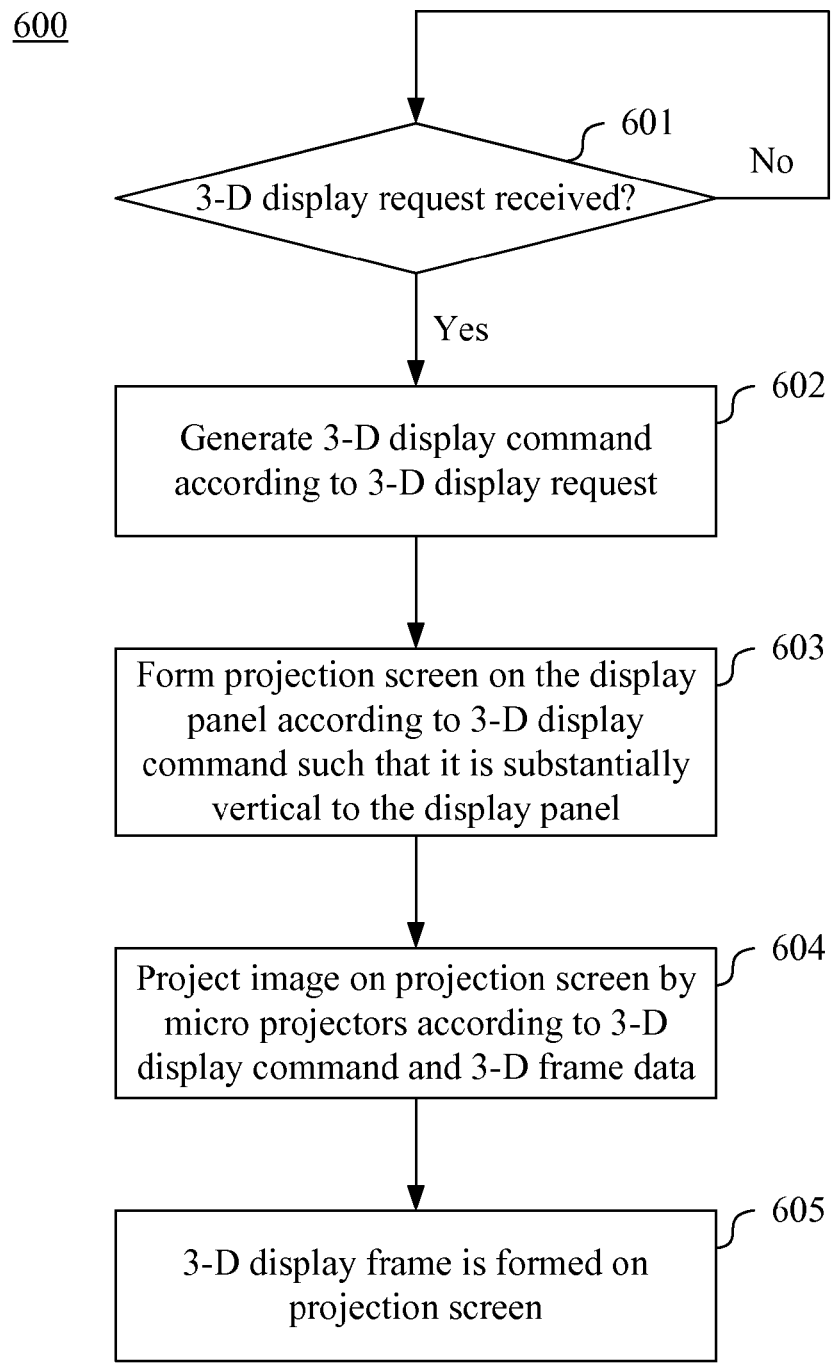
FIG. 6 is a flow chart of a 3-D image projection method in an embodiment of the present invention.

FIG. 6 is a flow chart of a 3-D image projection method 600 in an embodiment of the present invention. The 3-D image projection method 600 can be used in the electronic device 1 depicted in FIG. 1A and FIG. 1B. The 3-D image projection method 600 comprises the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 601, the processing module 14 determines whether a 3-D display request 13 is received. When the 3-D display request 13 is not received, the flow goes back to step 601.

In step 602, the processing module 14 generates a 3-D display command 15 when the 3-D display request 13 is received.

In step 603, the processing module 14 control the projection screen 16 to be formed according to the 3-D display command 15 such that the projection screen 16 is substantially vertical to a display panel 12 on a main body 10 of the electronic device 1, wherein a light refractive rate of the projection screen 16 is different from that of the air around the projection screen 16.

In step 604, the processing module 16 controls the micro projectors 18 disposed in a circumference of the display panel 12 of the electronic device 1 to project an image on the projection screen 16 according to the 3-D display command and 3-D frame data.

In step 605, a 3-D display frame 19 is formed on the projection screen 16 according to the projection of the micro projectors 18.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device having a 3-D (three-dimensional) image projection mechanism, comprising:
a display panel formed on a main body of the electronic device to display a 2-D (two-dimensional) display frame;
a processing module for determining whether a 3-D display request is received and for generating a 3-D display command when the 3-D display request is received;
a projection screen formed according to the 3-D display command and is substantially vertical to the display panel, wherein a light refractive rate of the projection screen is different from that of the air around the projection screen; and
at least two micro projectors disposed in a circumference of the display panel for projecting an image on the projection screen according to the 3-D display command and 3-D frame data such that a 3-D display frame is formed on the projection screen.

2. The electronic device of claim 1, wherein the projection screen is a transparent plastic screen or a transparent glass screen.

3. The electronic device of claim 2, wherein the projection screen is disposed parallelly on the display panel before the processing module generates the 3-D display command.

4. The electronic device of claim 3, wherein the projection screen further comprises a rotary axis side, the projection screen rotates relative to the rotary axis side according to the 3-D display command such that the projection screen is substantially vertical to the display panel.

5. The electronic device of claim 4, wherein the projection screen comprises two lateral sides adjacent to the rotary axis side such that the projection screen rotates relative to the rotary axis side to be substantially vertical to the display panel after the two lateral sides of the projection screen move laterally with respect to the main body to a fixed position of the electronic device according to the 3-D display command.

6. The electronic device of claim 4, wherein after the projection screen is rotated to be substantially vertical to the display panel, the projection screen further rotates relative to a central axis substantially vertical to the display panel such that the at least two micro projectors project the image on the rotated projection screen.

7. The electronic device of claim 1, wherein the projection screen is a wall of airflow generated from an air passage according to the 3-D display command.

8. The electronic device of claim 7, further comprising a heat-dissipating module connected to the air passage, wherein the wall of airflow is generated according to exhausting a heat-dissipating airflow from the heat-dissipating module through the air passage.

9. The electronic device of claim 1, wherein the processing module determines whether the 3-D display request is received when the processing module receives a communication connection request.

10. The electronic device of claim 1, wherein the processing module determines whether the 3-D display request is received when the processing module receives a video playback request.

11. The electronic device of claim 1, wherein the at least two micro projectors are embedded in the main body of the electronic device before the processing module generates the 3-D display command and the at least two micro projectors are ejected from the main body to project the image after the processing module generates the 3-D display command.

12. A 3-D image projection method used in an electronic device, comprising:
   determining whether a 3-D display request is received;
   generating a 3-D display command according to the 3-D display request when the 3-D display request is received;
   forming a projection screen according to the 3-D display command such that the projection screen is substantially vertical to a display panel on a main body of the electronic device, wherein a light refractive rate of the projection screen is different from that of the air around the projection screen;
   projecting an image on the projection screen by at least two micro projectors disposed in a circumference of the display panel according to the 3-D display command and 3-D frame data;
   forming a 3-D display frame on the projection screen.

13. The 3-D image projection method of claim 12, wherein the projection screen is a transparent plastic screen or a transparent glass screen; the projection screen is disposed parallelly on the display panel before the processing module generates the 3-D display command; and the step of forming the projection screen further comprises rotating the projection screen relative to a rotary axis side according to the 3-D display command such that the projection screen is substantially vertical to the display panel.

14. The 3-D image projection method of claim 12, wherein the projection screen comprises two lateral sides adjacent to the rotary axis side such that the projection screen rotates relative to the rotary axis side to be substantially vertical to the display panel after the two lateral sides of the projection screen move laterally with respect to the main body to a fixed position of the electronic device according to the 3-D display command.

15. The 3-D image projection method of claim 14, wherein the step of forming the projection screen further comprises rotating the projection screen relative to a central axis substantially vertical to the display panel such that the at least two micro projectors project the image on the rotated projection screen.

16. The 3-D image projection method of claim 12, wherein the projection screen is a wall of airflow; the step of forming the projection screen further comprises generating the wall of airflow from an air passage according to the 3-D display command.

17. The 3-D image projection method of claim 16, wherein the step of generating the wall of airflow from the air passage further comprising exhausting a heat-dissipating airflow from a heat-dissipating module of the electronic device through the air passage.

18. The 3-D image projection method of claim 12, wherein the step of determining whether the 3-D display request is received further comprises receiving a communication connection request so as to determine whether the 3-D display request is received.

19. The 3-D image projection method of claim 12, wherein the step of determining whether the 3-D display request is received further comprises receiving a video playback request so as to determine whether the 3-D display request is received.

20. The 3-D image projection method of claim 12, wherein the step of projecting the image on the projection screen by the at least two micro projectors further comprises ejecting the at least two micro projectors from a main body of the electronic device so as to project the image.

\* \* \* \* \*